United States Patent
Trim et al.

(10) Patent No.: US 11,277,277 B2
(45) Date of Patent: Mar. 15, 2022

(54) INDOOR ENVIRONMENT PERSONALIZATION PREFERENCES

(71) Applicant: INTERNATIONAL BUSINESS MACHINES CORPORATION, Armonk, NY (US)

(72) Inventors: Craig M. Trim, Ventura, CA (US); Shikhar Kwatra, Durham, NC (US); Adam Lee Griffin, Dubuque, IA (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 16/429,208

(22) Filed: Jun. 3, 2019

(65) Prior Publication Data
US 2020/0382335 A1 Dec. 3, 2020

(51) Int. Cl.
*H04L 12/28* (2006.01)
*G06N 20/00* (2019.01)

(52) U.S. Cl.
CPC ......... *H04L 12/2829* (2013.01); *G06N 20/00* (2019.01); *H04L 12/282* (2013.01); *H04L 12/2814* (2013.01)

(58) Field of Classification Search
CPC .................................................. H04L 12/2829
See application file for complete search history.

(56) References Cited

U.S. PATENT DOCUMENTS

| 7,644,051 | B1 | 1/2010 | Moore | |
|---|---|---|---|---|
| 8,554,559 | B1* | 10/2013 | Aleksic | G10L 15/30 704/235 |
| 9,256,230 | B2 | 2/2016 | Matsuoka | |
| 10,208,976 | B2 | 2/2019 | Toyoshima | |
| 2012/0059522 | A1 | 3/2012 | Vieira | |
| 2015/0088786 | A1 | 3/2015 | Anandhakrishnan | |
| 2016/0123617 | A1 | 5/2016 | Vega | |
| 2016/0162992 | A1* | 6/2016 | England | G06Q 40/06 705/36 R |
| 2016/0185220 | A1* | 6/2016 | Mere | B60K 37/06 340/438 |
| 2016/0187899 | A1 | 6/2016 | Lee | |

(Continued)

OTHER PUBLICATIONS

Adcock, "Think you need a 2000 sqft house to be comfortable? Think again!", ThinkSaveRetire [online], Posted on Sep. 16, 2015, [retrieved on Jun. 3, 2019], 5 pages, Retrieved from the Internet: <URL: https://thinksaveretire.com/think-you-need-a-2000-sqft-house-to-be-comfortable-think-again/>.

(Continued)

*Primary Examiner* — Nathan L Laughlin
(74) *Attorney, Agent, or Firm* — Alexis N. Hatzis

(57) ABSTRACT

A method, computer system, and a computer program product for environment personalization is provided. The present invention may include initializing a profile of a user. The present invention may include defining a baseline within the profile of the user. The present invention may include tracking a plurality of user data. The present invention may include storing the tracked plurality of user data in a tracked user database. The present invention may lastly include optimizing an environmental condition based on the tracked plurality of user data.

20 Claims, 6 Drawing Sheets

(56) References Cited

U.S. PATENT DOCUMENTS

| | | | |
|---|---|---|---|
| 2016/0195856 A1* | 7/2016 | Spero | G05B 15/02 |
| | | | 700/90 |
| 2017/0003047 A1 | 1/2017 | Grohman | |
| 2017/0090450 A1* | 3/2017 | Taite | A47B 61/00 |
| 2017/0110117 A1* | 4/2017 | Chakladar | G10L 15/16 |
| 2017/0349027 A1* | 12/2017 | Goldman-Shenhar | |
| | | | B60H 1/0075 |
| 2018/0285463 A1* | 10/2018 | Choi | G06F 16/9535 |
| 2018/0373234 A1* | 12/2018 | Khalate | G05B 23/0221 |
| 2019/0180499 A1* | 6/2019 | Caulfield | G06T 15/06 |
| 2019/0295125 A1* | 9/2019 | Marino | G06N 20/00 |
| 2020/0186382 A1* | 6/2020 | Harel | H04N 21/25891 |

OTHER PUBLICATIONS

Keen, "Keen Smart Vent System for HVAC systems", 2 pages, [retrieved on Jun. 3, 2019], Retrieved from the internet: <http://iotlineup.com/device/keen_home>.

Mell et al., "The NIST Definition of Cloud Computing", National Institute of Standards and Technology, Special Publication 800-145, Sep. 2011, pp. 1-7.

Nest, "See who's at the door", Datasheet [online], Retrieved on Jun. 3, 2019], 7 pages, Retrieved from the Internet <URL: https://nest.com/>.

Slide, "IoT Curtains", Indiegogo, Posted on Jan. 8, 2017 [retrieved on Jun. 3, 2019], 14 pages, Retrieved from the Internet: <URL: https://www.indiegogo.com/projects/slide-make-your-existing-curtains-smart-3#/>.

* cited by examiner

INDOOR ENVIRONMENT PERSONALIZATION PREFERENCES

BACKGROUND

The present invention relates generally to the field of computing, and more particularly to mobile technology devices.

Newer homes may be built larger than older homes. Much of the space of newer homes may not be used to full capacity. Nevertheless, heating, ventilation, and air conditioning (HVAC) systems may service the entire square footage of newer homes, regardless of the percentage of the home being used.

SUMMARY

Embodiments of the present invention disclose a method, computer system, and a computer program product for environment personalization. The present invention may include initializing a profile of a user. The present invention may include defining a baseline within the profile of the user. The present invention may include tracking a plurality of user data. The present invention may include storing the tracked plurality of user data in a tracked user database. The present invention may lastly include optimizing an environmental condition based on the tracked plurality of user data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
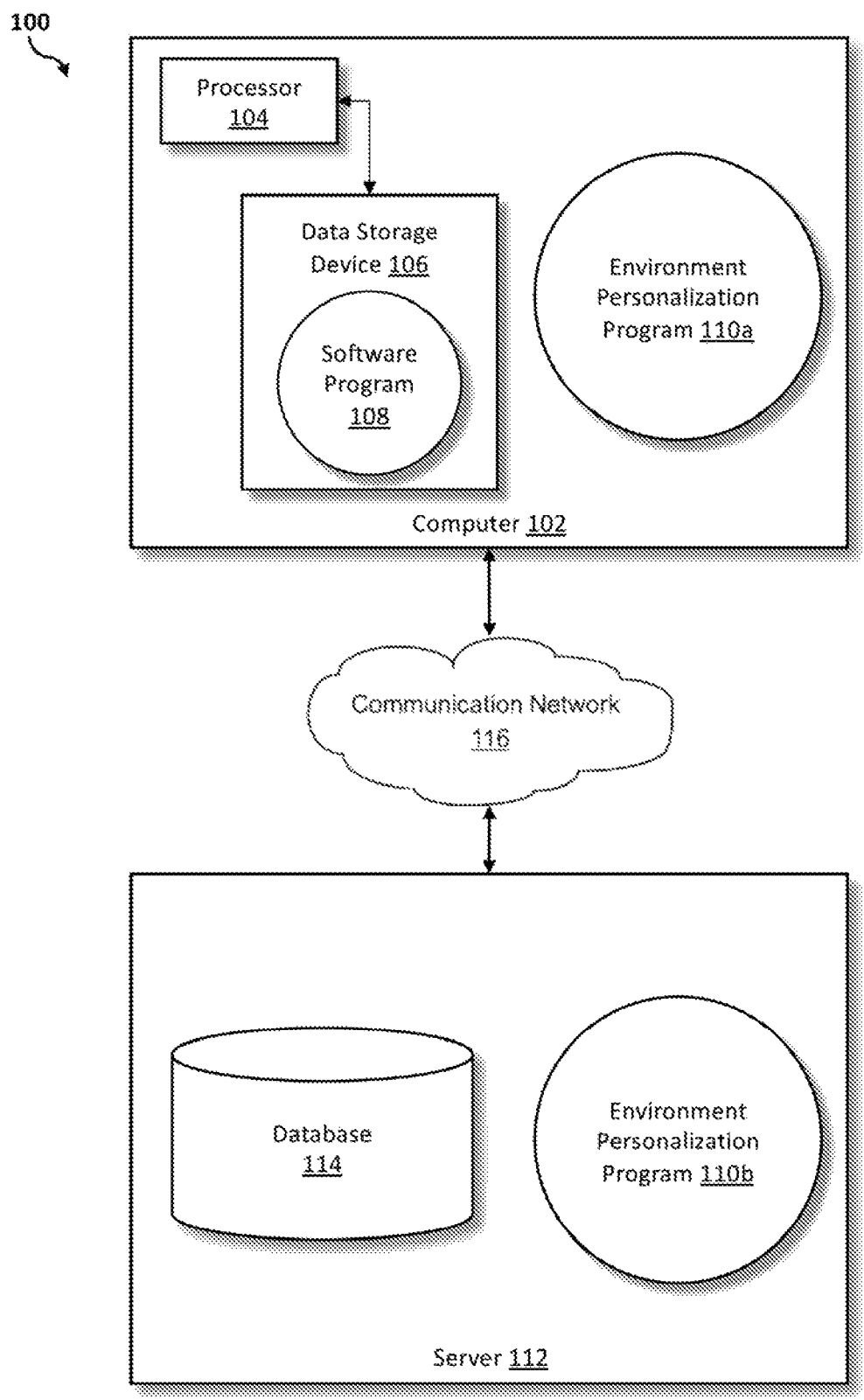
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for environment personalization. As such, the present embodiment has the capacity to improve the technical field of mobile technology devices by considering a user's location within a structure and tailoring environmental settings to the preferences of the user present within the structure. More specifically, the present invention may include initializing a profile of a user. The present invention may include defining a baseline within the profile of the user. The present invention may include tracking a plurality of user data. The present invention may include storing the tracked plurality of user data in a tracked user database. The present invention may lastly include optimizing an environmental condition based on the tracked plurality of user data.

As described previously, newer homes may be built larger than older homes. Much of the space of newer homes may not be used to the home's full capacity. Nevertheless, heating, ventilation, and air conditioning (HVAC) systems may service the entire square footage of newer homes, regardless of the percentage of the home being used.

Homeowners may customize indoor environments in several ways. For example, a smart thermostat may be programmed and configured with a schedule which meets a user's preferences with regard to temperature, fan level, and humidity level, among other things. Smart thermostats may be instantaneously updated using mobile and/or web applications which may wirelessly connect to the smart thermostat through Bluetooth® (Bluetooth and all Bluetooth-based trademarks and logos are trademarks or registered trademarks of Bluetooth SIG, Inc. and/or its affiliates) and/or wi-fi technology. Traditional thermostats may alternatively and/or additionally be configured by a user by manually interacting with the physical thermostat device.

Both smart and traditional thermostats may enable a user to change an environmental condition and to schedule specific times during which desired environmental conditions should be met. However, both smart and traditional thermostats may function by servicing an entire home and/or apartment, and/or by servicing one or more predefined zones. There may not be a means by which a smart and/or traditional thermostat may service personalized preferences of a user, or that such personalized preferences of the user may be maintained as the user moves from room to room.

Therefore, it may be advantageous to, among other things, consider a user's location within a structure and tailor environmental settings to the preferences of the user or users present within the structure.

According to at least one embodiment, the present invention may take into consideration a user's presence in a given room and may heat and/or cool a room based on the user's personal preferences.

According to at least one embodiment, the present invention may utilize alternate interconnected systems in an internet of things (IoT) environment and/or network.

According to at least one embodiment, the present invention may interact with an HVAC system of a user's home and/or an HVAC system of a larger commercial building. In either instance, the functionality of the present invention may remain the same, while the number of zones, connected internet of things (IoT) devices, and users present within the home and/or commercial building may differ (e.g., increase).

According to at least one embodiment, the present invention may track one or more users using connected internet of things (IoT) devices (e.g., facial and/or voice recognition systems, among other things) and may alter the environment of the location a user is occupying. The present invention may continuously update environmental conditions based on the movement of users from one location to another. Environmental conditions may differ from one location to another based on the presence of a given user in a particular location. For example, the present invention may update environmental conditions on an individual basis, altering the environment of each location to the preferences of the user present within that location.

A location of a user may be determined based on preconfigured geofences (e.g., a virtual geographic boundary defined based on coordinates) using global positioning system (GPS) and/or radio-frequency identification (RFID) technology, among other things.

According to at least one embodiment, the present invention may enable personalization of environmental conditions based on learned hyper localized parameters as well as a user satisfaction level. A learned hyper localized parameter may be a user specific parameter that is unique to an individual user. For example, learned hyper localized parameters for a user Jimmy may include that Jimmy prefers to keep his room at 72 degrees Fahrenheit, Jimmy does not like fans on when he sleeps, Jimmy prefers to keep his curtains closed, and Jimmy enjoys sleeping late. These parameters may apply only to Jimmy's bedroom as they relate to Jimmy's sleeping preferences.

A user satisfaction level may be determined dynamically based on continuous monitoring of the user's frustration level and/or reaction to changes in environmental conditions. The present invention may determine an optimal environmental condition based on an average user satisfaction level in order to reach overall satisfaction of users present within the environment.

Monitoring via one or more connected internet of things (IoT) devices may be done after obtaining consent of the user. Embodiments of the present invention may provide a means for obtaining consent of the user via an opt-in and/or opt-out feature and, in certain circumstances, the user may be notified (e.g., via a message on a connected internet of things [IoT] device) when the system begins data collection and/or transfer.

According to at least one embodiment, for cost savings purposes, the present invention may maintain the optimal environmental condition (e.g., lighting, sound, temperature, etc.) and may only alter the environmental condition of a location where an occupant (e.g., one or more users) is found.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an environment personalization program 110a. The networked computer environment 100 may also include a server 112 that is enabled to run an environment personalization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented.

Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the environment personalization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the environment personalization program 110a, 110b (respectively) to consider a user's location within a structure and tailor environmental settings to the preferences of the user present within the structure. The environment personalization method is explained in more detail below with respect to FIGS. 2 and 3.

Figure 2:
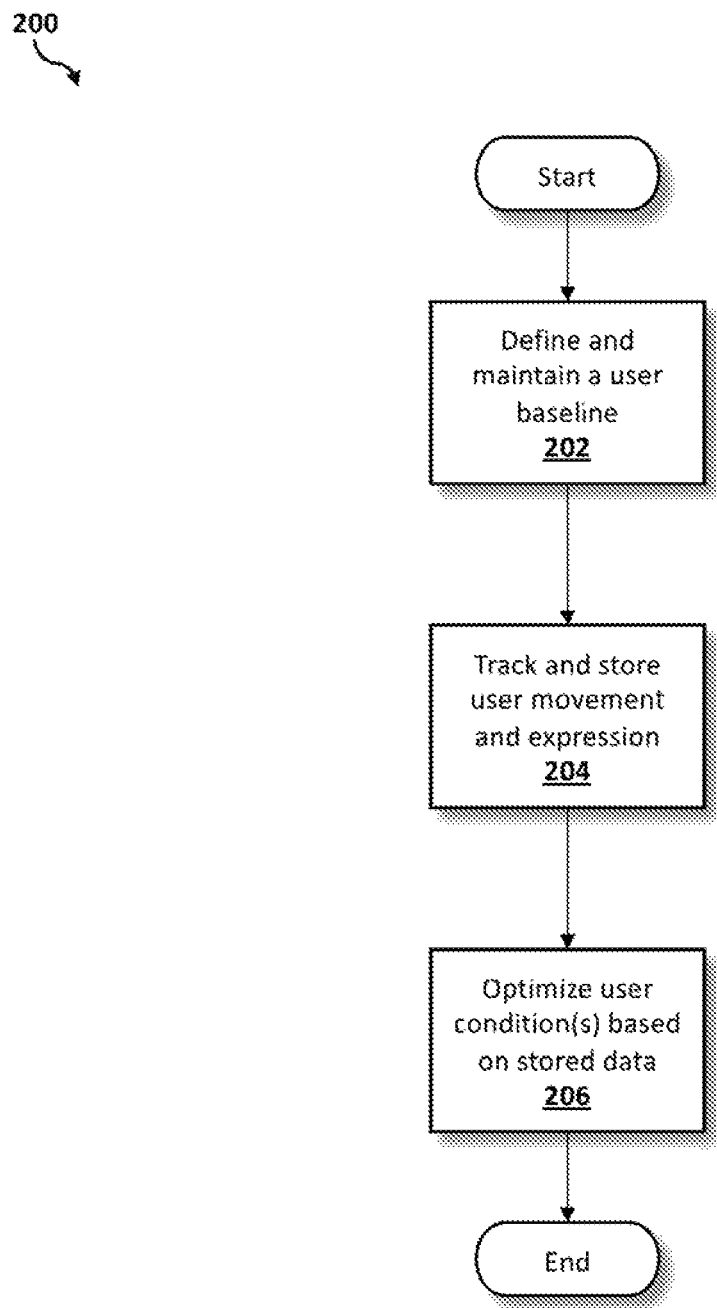
FIG. 2 is an operational flowchart illustrating a process for environment personalization according to at least one embodiment.

Referring now to FIG. 2, an operational flowchart illustrating the exemplary environment personalization process 200 used by the environment personalization program 110a and 110b according to at least one embodiment is depicted.

At 202, a user baseline is defined and maintained. The environment personalization program 110a, 110b may utilize one or more mobile and/or internet connected internet of things (IoT) devices to monitor where in a structure (e.g., a building, a house, an apartment, an office, etc.) a user is situated. The one or more IoT devices may monitor daily room occupancy habits in order to learn the habits of users of the environment personalization program 110a, 110b and to teach the environment personalization program 110a, 110b any preferred user settings.

As described previously, monitoring via one or more connected internet of things (IoT) devices may be done after obtaining consent of the user. Embodiments of the present invention may provide a means for obtaining consent of the user via an opt-in and/or opt-out feature and, in certain circumstances, the user may be notified (e.g., via a message on a connected internet of things [IoT] device) when the system begins data collection and/or transfer.

The environment personalization program 110a, 110b may be initialized by creating a user profile for each user of the environment personalization program 110a, 110b. A user profile may include photographs of the user, voice samples of the user, daily habits of the user, and any preferences of the user. User profiles may be stored in a database of user profiles (i.e., database 114), which may be accessible by the environment personalization program 110a, 110b via a communication network (i.e., communication network 116).

The user baseline defined here may be provided by a user by the user manually entering the baseline within the user profile and/or may be learned by the environment personalization program 110a, 110b. A user may input a defined baseline as a machine learning optimization starting point, which may thereafter be maintained and improved upon by learning how much time a user spends in a given room, what room(s) the user frequents, and what time the user is present within a given room, among other things. The defined baseline may be maintained and improved upon through the use of machine learning algorithms.

At 204, user movement and expression are tracked. A mobile and/or internet connected internet of things (IoT) device may track a user as the user moves through a structure. The environment personalization program 110a, 110b may utilize connected devices such as watches, phones, wearable devices (e.g., fitness trackers, heartrate monitors, GPS trackers, etc.), and cameras, among other things, to track a user's movement. Tracking a user's movement may include receiving, sharing, processing and/or recording the following details: a user's location in a structure based on one or more predefined geofences; an amount of time a user spends in each room (e.g., a geofenced location); the time of day in which a user moves to a different room; the frequency with which a user changes rooms; the time of day that each room is used (e.g., a kitchen is used from 5:00 PM to 7:00 PM for meal preparation and consumption); the change in a user's position and/or location; the time of day that a user engages in one or more activities (e.g., cooking, reading, cleaning, working out, etc.); any biometric and/or bio signal data from incorporated internet of things (IoT) devices; any weather forecasting announcements (e.g., from an analytics engine and/or module utilizing artificial intelligence and/or machine learning to exhibit weather prediction capabilities); and/or a recorded temperature in each room or in an entire structure.

The user details, described above, may be received by the environment personalization program 110a, 110b from a user's wearable device. The wearable device may be configured to automatically and/or optionally upload gathered data to a cloud-based system. The wearable device may gather data of the user wearing the device, including heart rate and location information, among other data, and may stream the data to a cloud-based system for processing in the cloud. A user's wearable device may enable the collection of user data which may be used by the environment personalization program 110a, 110b to learn a user's preferences.

A plurality of user data, such as the tracked data described above, may be stored in a connected database (i.e., database 114) which may be accessible by the environment personalization program 110a, 110b. Data stored in the connected database (i.e., a tracked user database) may be maintained for a period of time defined by an administrative user (i.e., an administrator) of the environment personalization program 110a, 110b within a web-accessible portal. Data stored in the connected database (i.e., the tracked user database) may be utilized to teach the environment personalization program 110a, 110b of user preferences and to optimize user conditions, as will be discussed in more detail below with respect to step 206.

For example, by evaluating data stored in the tracked user database, the environment personalization program 110a, 110b may learn a user's habits, including but not limited to the one or more rooms the user frequents and the sequence with which the user visits the frequented rooms. Therefore, when the user is tidying up in one room and preparing to exit the room and to enter another room, the environment personalization program 110a, 110b may know with a given certainty the room that the user is preparing to enter and may restore optimal environmental conditions in the room the user is exiting and establish the user's preferred environmental condition in the room the user is likely to enter. A user or administrator of the environment personalization program 110a, 110b may provide that a certainty of at least 75% is required in order to modify environmental conditions prior to a user entering a new room. If the environment personalization program 110a, 110b does not predict with at least 75% certainty that the user will enter a given room, then the environment personalization program 110a, 110b should wait until the user exits the current room and enters a new room before modifying environmental conditions.

A user may be tracked using image recognition techniques, including but not limited to convolutional neural networks (CNN) and regional convolutional neural networks (R-CNN), which may be useful for object detection. A CNN may be architecturally comprised of separate and distinct layers, for example, a convolutional layer, a max pooling layer, and a fully connected layer.

The convolutional layer within the CNN may be the building block of the CNN and may consist of one or more filters used to encode (e.g., highlight) a portion of the matrix. The filter may be referred to as a sliding window, as only the encoded portion of the matrix may be exposed. The exposed portion of the matrix may be referred to as the receptive field, and the sliding window process may be referred to as convolving. The exposed portion of the matrix may be multiplied by a predefined variable within the filter. This process may be referred to as element-wise multiplication and may be repeated for every portion of the matrix. The product of all element-wise multiplications at each portion of the matrix may be placed in a resulting matrix. If the convolutional layer within the CNN consists of more than one filter, then the element-wise multiplication may be computed for each filter.

The max pooling layer within the CNN may consist of identifying the maximum value in a max filter space to reduce the dimensionality and complexity of the CNN. The max pooling layer may traverse every portion of the resulting matrix exposed by a max filter and may identify the largest value from the exposed portion and place this value in a new matrix. Every value in the new matrix may represent the maximum value of a region of the input to the max pooling layer. The max pooling layer of the CNN may prevent the model from overfitting the data or being too closely fit to a given input.

The fully connected layer of the CNN may take as input the result of the max pooling layer which may have preceded it and may determine which features of the matrix correlate most closely to pre-trained biases. Each portion of the inputted matrix may be connected to a neuron in the pre-trained CNN.

Image recognition techniques, described above, may be utilized with geo-spatial and temporal metrics involving feature identification (e.g., facial micro expressions and speech features via a mel-frequency cepstral coefficient (MFCC) feature extraction method). For example, image recognition techniques may use connected devices (e.g., a connected camera) to view video footage which may indicate that a user is struggling with extreme temperatures based on the fact that the user is shaking and wearing a heavy jacket indoors. The user's discomfort may also be identified by the environment personalization program 110a, 110b based on detection of chills on the user's arms and/or an utterance of the word "bbrrrr."

Conversation analysis and sentiment analysis application programming interfaces (APIs) may also be used to dynamically determine a frustration level of users within the localized geofenced area, in order to iteratively change the surroundings and to improve the success threshold (i.e., satisfaction) of the users located within the confined environment.

A sentiment analysis API may determine whether a user is temperamental, angry, disappointed, sad, or happy, among other things.

A tone analyzer API may measure dialog between the user and another user or users present within the same geofenced area to determine whether the dialog is adversarial, frustrated, or friendly. The environment personalization program 110a, 110b may determine a user's frustration level from this short interaction or set of interactions. For a user whose tone has already been analyzed and stored in the tracked user database (i.e., database 114), the environment personalization program 110a, 110b may determine whether the user's current tone is the same as a previously recorded tone, before determining that a mild level of aggression means that the user is frustrated (e.g., that might be the user's normal speaking voice). A tone analyzer API may utilize the tracked user database (i.e., database 114) to determine whether a present interaction depicts a tone which is intense, lighthearted, serious, adversarial, frustrated, or friendly, among many other tones of voice.

Likewise, the environment personalization program 110a, 110b may analyze a captured video to determine the user's frustration level and/or level of satisfaction. The environment personalization program 110a, 110b may utilize mobile and/or internet connected cameras to determine when there is movement in a field of view (e.g., within a particular geofenced location) and a video analysis API may assign characteristics to the user viewed, including a determined hair color, whether the user viewed is wearing a hat, eyeglasses, and/or other accessories, whether the user viewed has facial hair, and an estimation of the height and age of the user viewed. Facial recognition technology may identify the user by comparing the determined user characteristics to the database of user profiles (i.e., database 114). If no existing user profile matches the determined characteristics of the user viewed, then a new user profile may be created and any tracked data corresponding to the new user may be stored in the new user profile.

If one or more users is located in the same room, detected via global positioning system (GPS) and beaconing triangulation mechanisms (e.g., by using three or more connected feeds, including video and audio, among others, to pinpoint the location of a user), then facial and speech expressions may be dynamically and continuously monitored utilizing mobile and/or internet connected internet of things (IoT) cameras located within the same geo-spatial region. User preferences may be determined after an identification of the user and of the user's preferences has been made. User preferences configured by the environment personalization program 110a, 110b, when more than one user is located in the same room (e.g., including but not limited to fan speed and room temperature, among other preferences), may correspond to an average preferred value for each user present within the room.

K-means clustering may be utilized to cluster user profiles based on dynamically changing comfort levels. K-means clustering may be an unsupervised machine learning algorithm which may cluster users together based on determined similarities.

At 206, user conditions are optimized based on stored data. The environment personalization program 110a, 110b may learn a user's preferences (e.g., using machine learning algorithms to make informed decisions pertaining to the usage of a given environment based on the users present within the environment), based on the data tracked and stored at step 204 above. The environment personalization program 110a, 110b may be optimized to utilize the least amount of energy necessary to achieve the user's desired environmental condition, among other things. In doing so, the environment personalization program 110a, 110b may learn how much energy may be expended to reach a desired environmental condition and may adjust environmental conditions at a certain time, or by a certain amount, in order to maintain the desired environmental condition of the user while utilizing the lowest amount of energy.

For example, the environment personalization program 110a, 110b recognizes, based on facial recognition techniques, described previously with respect to step 204 above, on images collected by connected internet of things (IoT) cameras, that a user Mary is in the kitchen. The environment personalization program 110a, 110b knows that Mary's preferred temperature is 74 degrees Fahrenheit, and that the kitchen temperature increases when a user is located in the space (e.g., due to the use of a stovetop or oven). The environment personalization program 110a, 110b knows, based on these factors, that even though the current temperature in the room is 73 degrees Fahrenheit, the temperature may increase above Mary's preferred temperature based on the use of kitchen appliances. Nevertheless, the environment personalization program 110a, 110b may not turn on the heat to achieve Mary's desired temperature at the outset of her entrance into the room, and may instead need to cool the room to Mary's preferred temperature if and/or when the temperature rises above Mary's preferred temperature of 74 degrees Fahrenheit. If within several minutes of Mary's entrance into the room, a preference which may be configured in the user profile as described previously with respect to step 202 above, the temperature does not rise above 73 degrees Fahrenheit, the environment personalization program 110a, 110b may adjust the temperature to Mary's preferred temperature. The environment personalization program 110a, 110b may alternatively, or additionally, utilize connected internet of things (IoT) outlet plugs for devices such as an oven and/or stove so that the environment personalization program 110a, 110b is alerted at the moment a connected device is turned on. In this case, the environment personalization program 110a, 110b may not need to wait several minutes to determine whether the temperature in the room will increase.

The environment personalization program 110a, 110b may enable a manual override whereby a human user may have the ability to override the settings generated by the environment personalization program 110a, 110b. This may contribute to the learning corpus and may further enhance optimization by the environment personalization program 110a, 110b.

The environment personalization program 110a, 110b may optimize user conditions based on several factors, including but not limited to frequency of use (e.g., of a given room) and expended energy levels. In this instance, the environment personalization program 110a, 110b may keep rooms that are used most frequently at a slightly cooler and/or warmer temperature depending on time of year. This may mean that rooms that are used more often during the summer months may be kept at an overall cooler temperature so that when a user enters the room it takes less time and energy to reach the user's preferred temperature. On the contrary, rooms that are used least frequently may be kept at a slightly warmer temperature due to the lack of inhabitance and the infrequent occasion by which a user may enter the room.

The above-described scenario may remain true during the winter months, with the warming and cooling effect switched.

Optimization of user conditions may change based on time of year. For example, the environment personalization program 110a, 110b may learn over time when to stop and/or start heating and/or cooling a location depending on season and time of year. Information pertaining to sunrise, sunset, and average temperature may be gathered from connected weather and/or news feeds.

Figure 3:
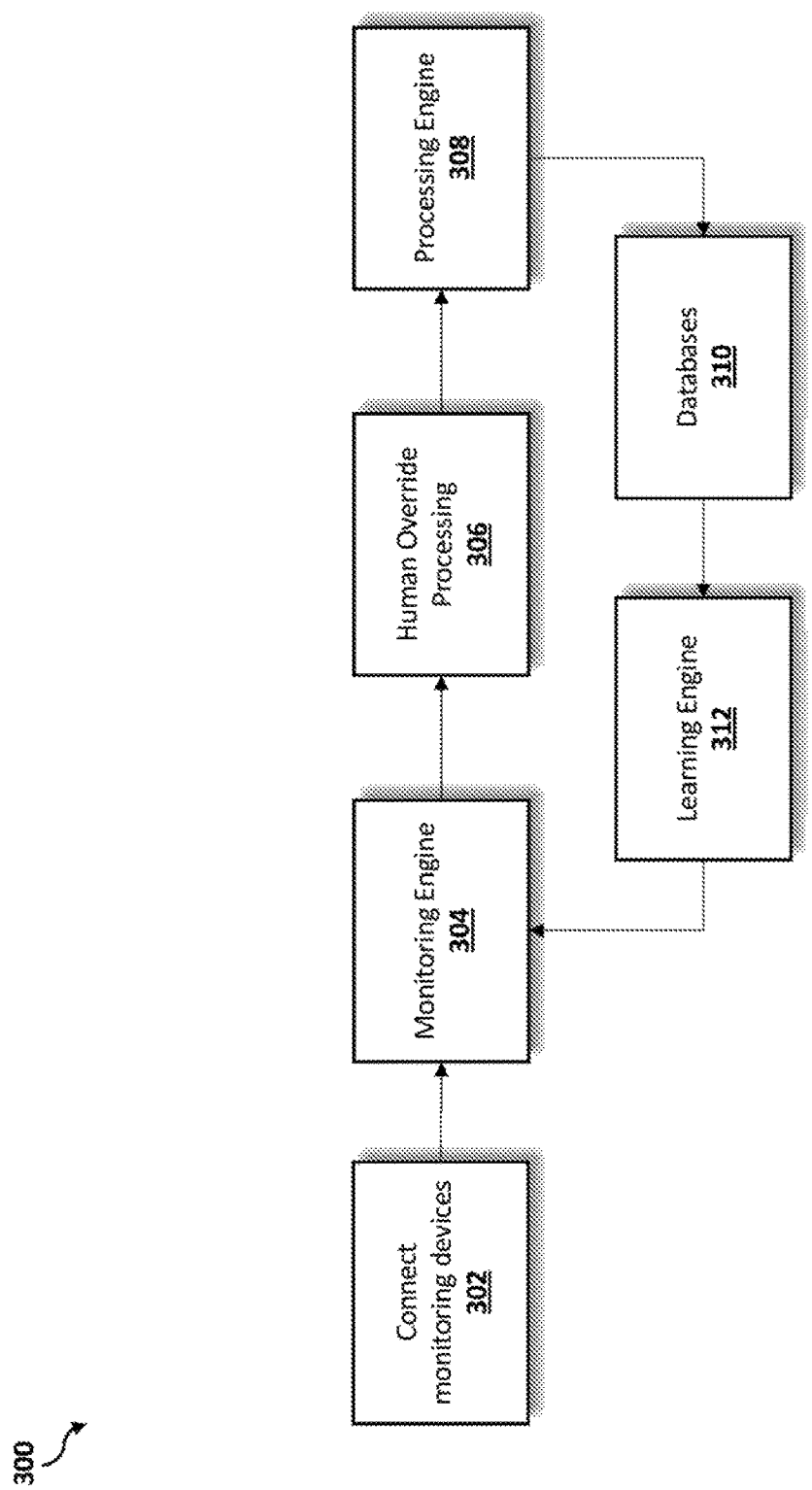
FIG. 3 is a block diagram of the environment personalization program according to at least one embodiment.

Referring now to FIG. 3, a block diagram 300 of the environment personalization program according to at least one embodiment is depicted. At 302, monitoring devices may be connected which may enable active monitoring by virtual assistant devices in rooms with at least one user present. At 304, a connected monitoring engine may passively monitor a room to detect whether a user is present. If one or more users is detected, the environment personalization program 110a, 110b engages and may modify the user's environment based on the user's preferences. At 306, a human exchange with a connected system may override an automatic setting configured by the environment personalization program 110a, 110b. At 308, a processing engine may create a confidence percentage ranking to determine whether the temperature of the room in which the user is present reflects the user's preferred temperature. At 310, connected databases, including a tracked user database, may store user data and preferences. At 312, a learning engine may monitor the user's behavior to determine whether the user is satisfied with any automatic environmental changes made by the environment personalization program 110a, 110b.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
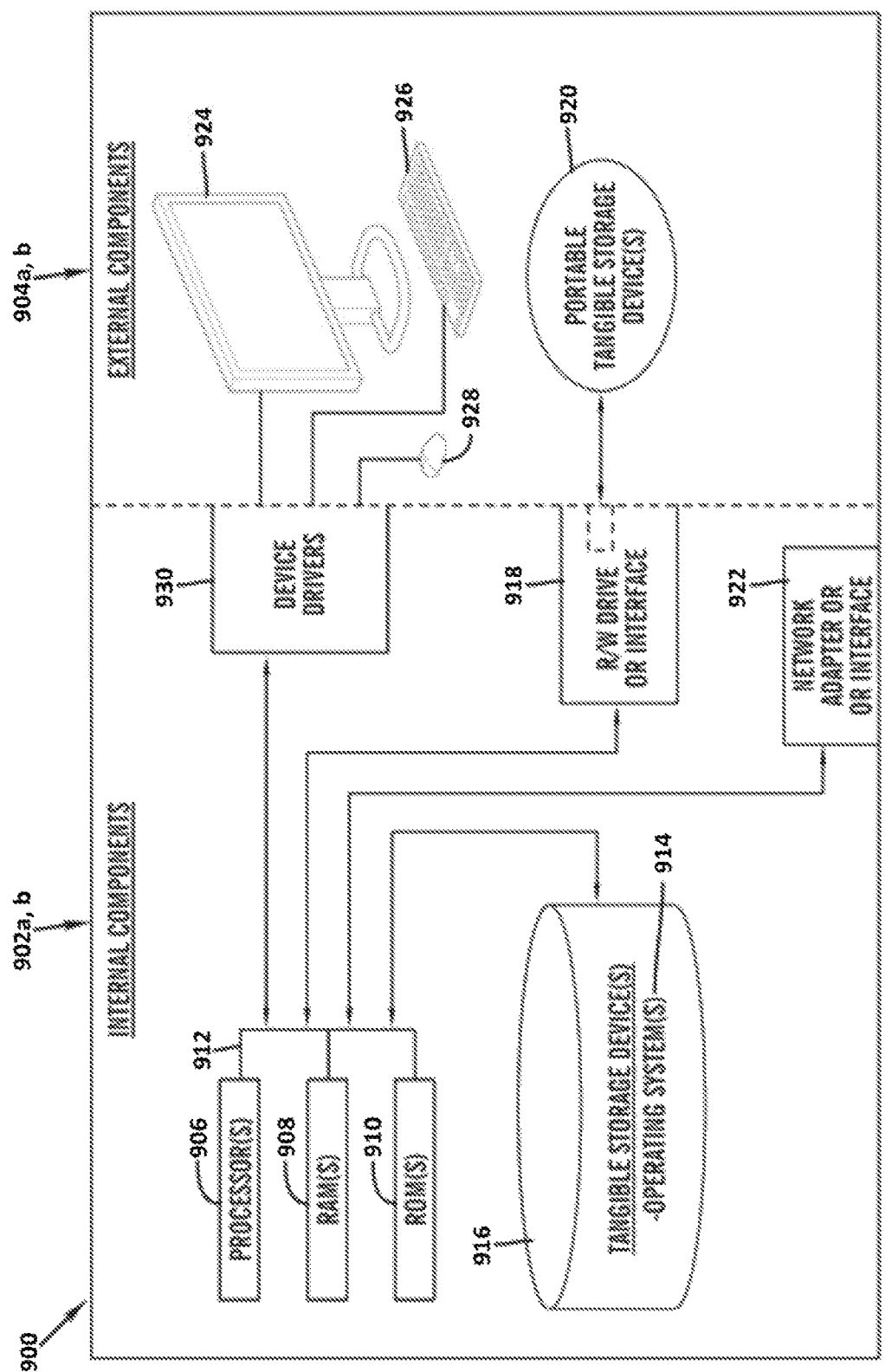
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the environment personalization program 110a in client computer 102, and the environment personalization program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the environment personalization program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the environment personalization program 110a in client computer 102 and the environment personalization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the environment personalization program 110a in client computer 102 and the environment personalization program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
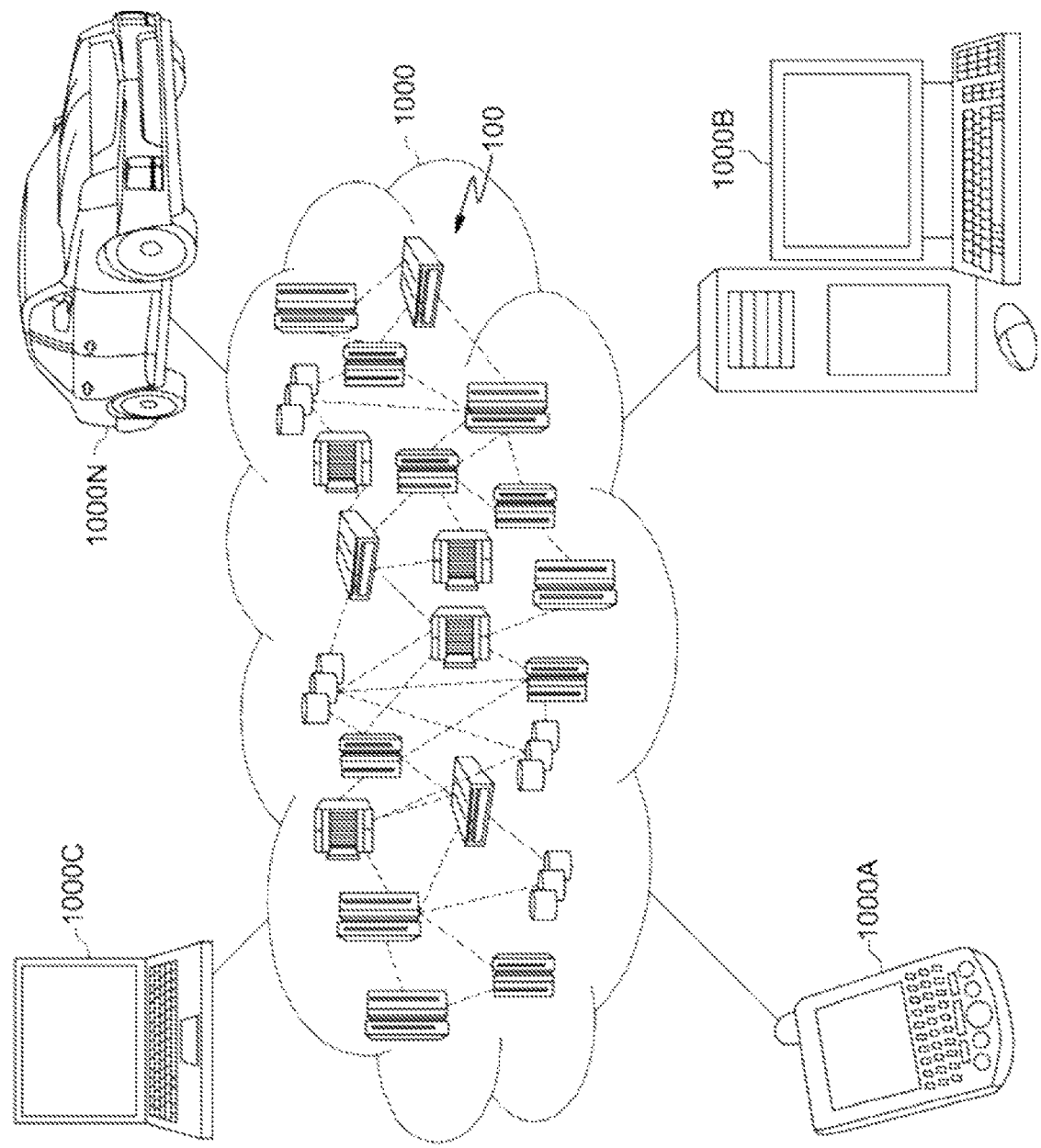
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
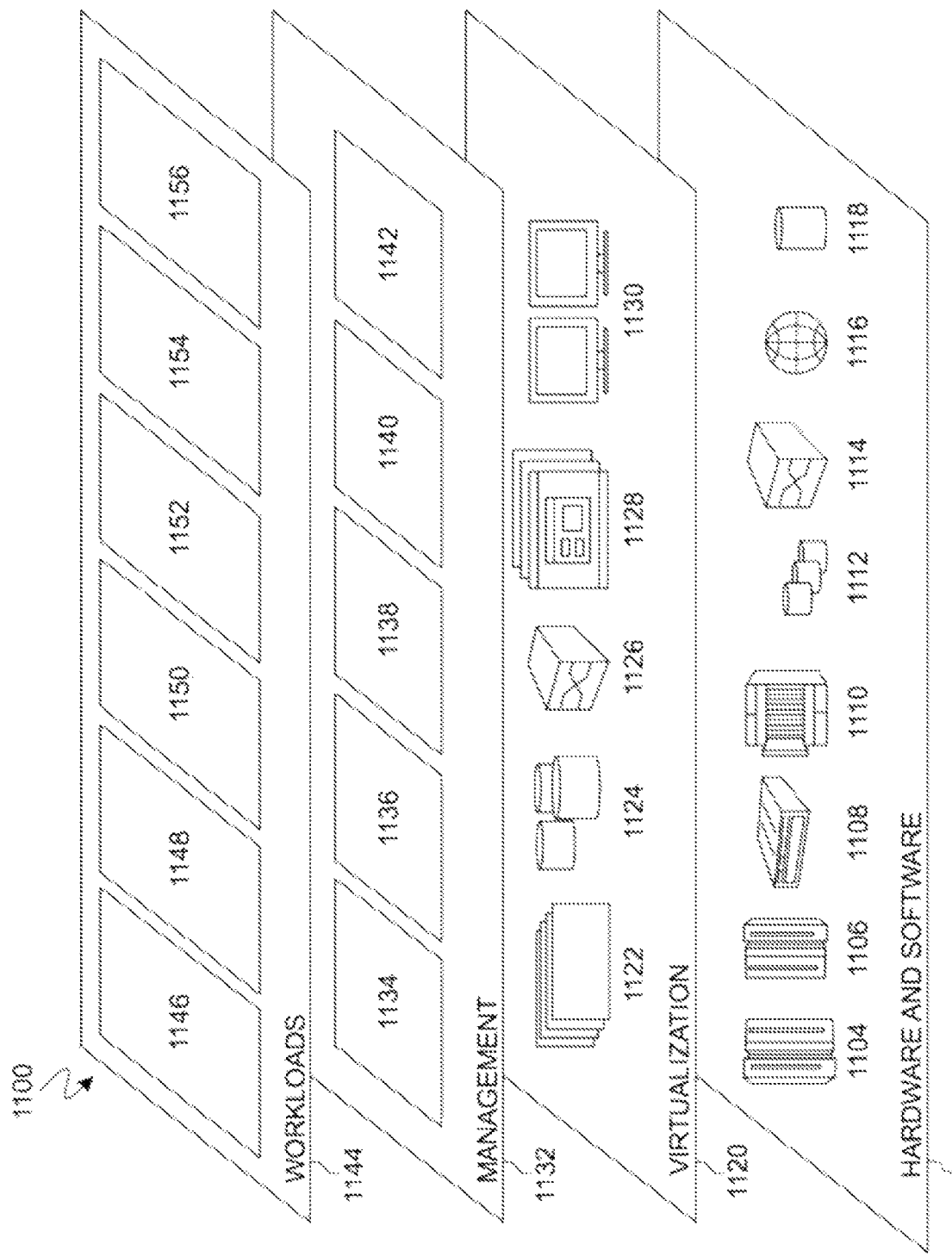
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124;

virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and environment personalization 1156. An environment personalization program 110a, 110b provides a way to consider a user or users' location within a structure and to tailor environmental settings to the preferences of the user or users present within the structure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for environment personalization, the method comprising:
    initializing a profile of a user;
    defining a baseline within the profile of the user, wherein the baseline includes a temperature of the environment;
    tracking a plurality of user data by performing image recognition using a convolutional neural network and feature identification on the image that was recognized using a mel-frequency cepstral coefficient feature extraction method, and further performing speech recognition to identify an utterance of the user using the mel-frequency cepstral coefficient feature extraction method;
    storing the tracked plurality of user data in a tracked user database; and
    optimizing an environmental condition based on the tracked plurality of user data, by at least modifying the temperature of the environment based on the identified utterance of the user or the recognized image of the user.

2. The method of claim 1, wherein the profile of the user includes a photograph, a voice sample, a daily habit, and a user preference.

3. The method of claim 1, wherein the baseline is defined by the user within the profile of the user and is updated through the use of a machine learning algorithm.

4. The method of claim 1, wherein the plurality of user data is collected by one or more mobile and/or internet connected internet of things (IoT) devices.

5. The method of claim 1, wherein the plurality of user data is collected by an internet connected internet of things (IoT) camera, which is activated when a movement is detected in a field of view of the camera, and wherein a video analysis application programming interface (API) analyzes the plurality of user data collected by the camera.

6. The method of claim 1, wherein user data is stored in the tracked user database for a period of time defined by an administrative user within a web-accessible portal.

7. The method of claim 1, wherein optimizing the environmental condition based on the tracked plurality of user data further comprises:
    learning a preference of the user based on the tracked plurality of user data; and
    adjusting the environmental condition based on the learned preferences of the user.

8. A computer system for environment personalization, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    initializing a profile of a user;
    defining a baseline within the profile of the user;
    tracking a plurality of user data by performing image recognition using a convolutional neural network and feature identification on the image that was recognized using a mel-frequency cepstral coefficient feature extraction method, and further performing speech recognition to identify an utterance of the user using the mel-frequency cepstral coefficient feature extraction method;
    storing the tracked plurality of user data in a tracked user database; and
    optimizing an environmental condition based on the tracked plurality of user data, by at least modifying the temperature of the environment based on the identified utterance of the user or the recognized image of the user.

9. The computer system of claim 8, wherein the profile of the user includes a photograph, a voice sample, a daily habit, and a user preference.

10. The computer system of claim 8, wherein the baseline is defined by the user within the profile of the user and is updated through the use of a machine learning algorithm.

11. The computer system of claim 8, wherein the plurality of user data is collected by one or more mobile and/or internet connected internet of things (IoT) devices.

12. The computer system of claim 8, wherein the plurality of user data is collected by an internet connected internet of things (IoT) camera, which is activated when a movement is detected in a field of view of the camera, and wherein a video analysis application programming interface (API) analyzes the plurality of user data collected by the camera.

13. The computer system of claim 8, wherein user data is stored in the tracked user database for a period of time defined by an administrative user within a web-accessible portal.

14. The computer system of claim 8, wherein optimizing the environmental condition based on the tracked plurality of user data further comprises:
   learning a preference of the user based on the tracked plurality of user data; and
   adjusting the environmental condition based on the learned preferences of the user.

15. A computer program product for environment personalization, comprising:
   one or more non-transitory computer-readable storage media and program instructions stored on at least one of the one or more tangible storage media, the program instructions executable by a processor to cause the processor to perform a method comprising:
   initializing a profile of a user;
   defining a baseline within the profile of the user;
   tracking a plurality of user data by performing image recognition using a convolutional neural network and feature identification on the image that was recognized using a mel-frequency cepstral coefficient feature extraction method, and further performing speech recognition to identify an utterance of the user using the mel-frequency cepstral coefficient feature extraction method;
   storing the tracked plurality of user data in a tracked user database; and
   optimizing an environmental condition based on the tracked plurality of user data, by at least modifying the temperature of the environment based on the identified utterance of the user or the recognized image of the user.

16. The computer program product of claim 15, wherein the profile of the user includes a photograph, a voice sample, a daily habit, and a user preference.

17. The computer program product of claim 15, wherein the baseline is defined by the user within the profile of the user and is updated through the use of a machine learning algorithm.

18. The computer program product of claim 15, wherein the plurality of user data is collected by one or more mobile and/or internet connected internet of things (IoT) devices.

19. The computer program product of claim 15, wherein the plurality of user data is collected by an internet connected internet of things (IoT) camera, which is activated when a movement is detected in a field of view of the camera, and wherein a video analysis application programming interface (API) analyzes the plurality of user data collected by the camera.

20. The computer program product of claim 15, wherein optimizing the environmental condition based on the tracked plurality of user data further comprises:
   learning a preference of the user based on the tracked plurality of user data; and
   adjusting the environmental condition based on the learned preferences of the user.

\* \* \* \* \*